United States Patent
Hong

Patent Number: 6,031,748
Date of Patent: Feb. 29, 2000

[54] POWER SAVING CIRCUIT OF POWER FACTOR ADJUSTING TYPE

[75] Inventor: Eui Sung Hong, Kyungsangbuk-do, Rep. of Korea

[73] Assignee: LG Electronics Inc., Seoul, Rep. of Korea

[21] Appl. No.: 09/241,401

[22] Filed: Feb. 2, 1999

[30] Foreign Application Priority Data

Feb. 6, 1998 [KR] Rep. of Korea ......................... 98/3440

[51] Int. Cl.[7] ........................... H02M 5/42; H02M 3/335
[52] U.S. Cl. .............................................. 363/89; 363/21
[58] Field of Search .................... 363/21, 84, 89, 363/95, 97, 131, 132

[56] References Cited

U.S. PATENT DOCUMENTS

| | | | |
|---|---|---|---|
| 5,465,039 | 11/1995 | Narita et al. | 320/32 |
| 5,519,286 | 5/1996 | Rodrigues et al. | 315/159 |
| 5,565,761 | 10/1996 | Hwang | 323/222 |
| 5,581,453 | 12/1996 | Ueta et al. | 363/49 |
| 5,774,347 | 6/1998 | Nakanishi | 363/21 |
| 5,910,891 | 6/1999 | Jo | 363/89 |

*Primary Examiner*—Adolf Deneke Berhane
*Attorney, Agent, or Firm*—Fleshner & Kim

[57] ABSTRACT

Power saving circuit of a power factor adjusting type, including a rectifying and smoothing part for rectifying, and smoothing an AC power into a DC voltage, a transformer connected to an output terminal on the rectifying and smoothing part for boosting the DC voltage to a level in proportion to a winding ratio thereof, a plurality of field effect transistors each connected to the rectifying and smoothing part and a ground terminal of the transformer for switching the DC voltage, and a voltage cutting off part connected to a gate terminal of the field effect transistor and a rectified voltage output terminal on the transformer for cutting off voltage generation in a primary winding and a secondary winding by means of photocoupler on reception of a control signal in a DPM mode, whereby complying with the standards both of the U.S.A and the Europe for a DPM mode by reducing a power consumption in the primary winding of a transformer in a DPM mode of a monitor and allowing the circuit to be produced at a low cost because no additional serve power is required for the DPM mode.

14 Claims, 3 Drawing Sheets

POWER SAVING CIRCUIT OF POWER FACTOR ADJUSTING TYPE

BACKGROUND OF THE INVENTION

1. Field of the Invention

The present invention relates to a power saving circuit for switching mode power supplies (SMPS), and more particularly to a power saving circuit of a power factor adjusting type, which can reduce a power consumption of a primary winding in a transformer in display power management.

2. Discussion of Related Art

Being a circuit mainly for saving energy, in general, the SMPS power saving circuit should comply with the EPA (Environmental Protection Agency) standard of the U.S.A. or the NUTEK (narings och teknikutveckling verket) of the Sweden to obtain a product approval, at which the product can be mark of the approval.

|  | EPA | NUTEK |
| --- | --- | --- |
| DPM on mode or Standby mode | below 15W | below 15W |
| DPM off mode | below 8W | below 5W |

Where the power consumptions are values obtained in tests at an AC voltage of 230V max., which power consumption standards should be satisfied.

FIG. 1 illustrates a system showing a related art boost up power factor adjusting circuit using a power feed back.

Referring to FIG. 1, the related art boost up power factor adjusting circuit is provided with a power source 1 for rectifying an AC power, a power factor adjusting unit 2 for adjusting a power factor of a voltage rectified through the power supply part 1, an SMPS 3 for switching the voltage provided through the power factor adjusting unit 2 to a peripheral circuit, and a microcomputer 4 for controlling the SMPS 3 according to a DPM. The unexplained reference symbol 2a denotes a power factor adjusting part, L1 denotes a choke coil D1 denotes a diode, C1 denotes a condenser, and Q1 denotes a field effect transistor.

In the related art power factor adjusting circuit when an external AC power is applied, the power supply part 1 rectifies the AC power and provides to the power factor adjusting unit 2. The rectified DC voltage is then removed of an AC component through the choke coil L1, smoothened through the diode D1 and condenser C1, provided to the SMPS 3, and converted into a required voltage for a peripheral circuit. In this instance, the power factor adjusting part 2a in the power factor adjusting unit 2 controls a switching operation of the field effect transistor Q1 according to an AC voltage for adjusting a power factor of the applied AC power. That is, a power factor of the AC voltage is improved such that a current wave of the AC voltage comes closer to a sinusoidal wave, for smooth supply of a DC voltage rectified through the diode D1 and the condenser C1 to the SMPS 3. In the meantime, the microcomputer 4 controls the SMPS 3 such that a high signal is provided to the SMPS 3 in a DPM on mode or standby mode, to cut off an output voltage from the SMPS 3, for reducing a power consumption, and a low signal is provided to the SMPS 3 in a DPM mode for providing a regular voltage.

However, since the related art power factor control circuit only controls the output voltage from the SMPS 3 by the microcomputer 4 regardless of the control of the field effect transistor Q1 by the power factor adjusting unit 2 in the DPM mode, which causes to consume a power at an input terminal on the SMPS 3, the related art power factor control circuit has a problem in that the DPM standard can not be complied with.

SUMMARY OF THE INVENTION

Accordingly, the present invention is directed to a power saving circuit of a power factor adjusting type that substantially obviates one or more of the problems due to limitations and disadvantages of the related art.

An object of the present invention is to provide a power saving circuit of a power factor adjusting type which can reduce a power consumption and comply with DPM standards.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the power saving circuit of a power factor adjusting type includes a rectifying and smoothing part for rectifying, and smoothing an AC power into a DC voltage, a transformer connected to an output terminal on the rectifying and smoothing part for boosting the DC voltage to a level in proportion to a winding ratio thereof, a plurality of field effect transistors each connected to the rectifying and smoothing part and a ground terminal of the transformer for switching the DC voltage, and a voltage cutting off part connected to a gate terminal of the field effect transistor and a rectified voltage output terminal on the transformer for cutting off voltage generations in a primary winding and a secondary winding by means of photocoupler on reception of a control signal in a DPM mode.

In other aspect of the present invention, there is provided a power saving circuit of a power factor adjusting type including a first, and a second power supply parts each for rectifying and smoothing an AC power to provide a DC voltage, a field effect transistor for switching the DC voltage from the first power supply part in a step up fashion according to cycles of a gate voltage, a power factor adjusting part connected to a gate terminal of the first field effect transistor and an output terminal on the second power supply part for adjusting a power factor of the DC voltage from the first power supply part, a second power supply part for rectifying the AC power to provide and apply a voltage B to the power factor adjusting part, a first rectifying part for rectifying and smoothing a voltage provided by a switching of the first rectifying part, a second field effect transistor for switching a voltage from the first rectifying part in response to a pulse width modulating signal, a transformer for boosting the voltage in proportion to a winding ratio as the second field effect transistor is switched, a second rectifying part for rectifying the voltage boosted by the transformer and providing to a peripheral circuit, a voltage cut off part for cutting off voltage generations in the primary and secondary windings of the transformer by means of photocoupler in reception of a DPM control signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
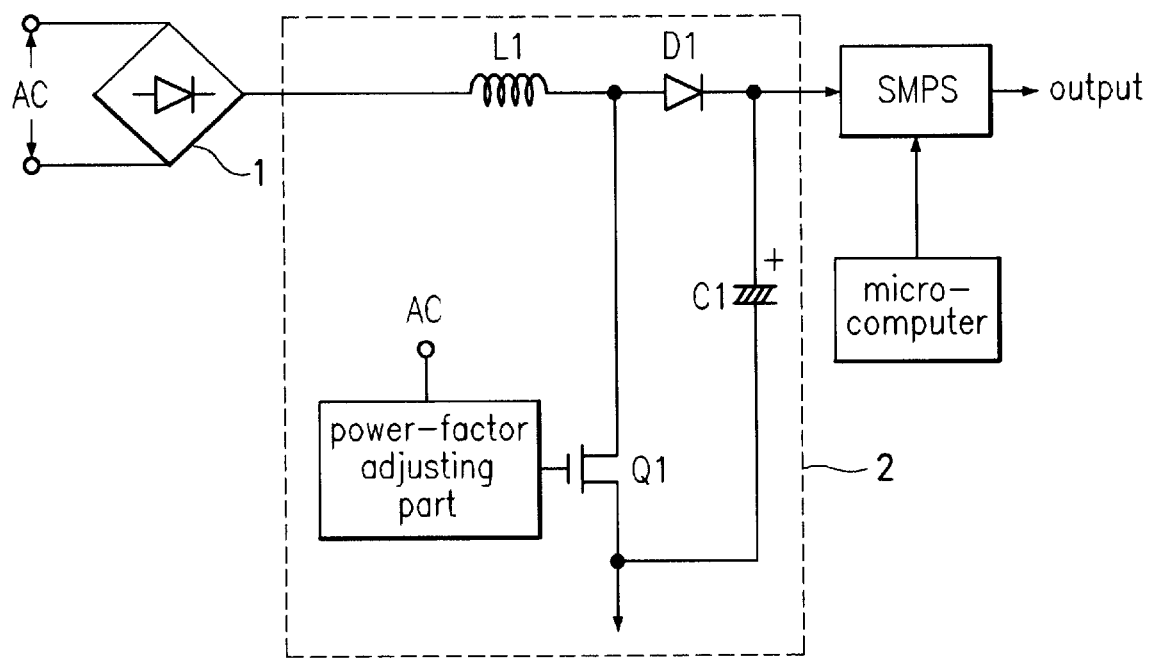
FIG. 1 illustrates a system showing a related art boost up power factor adjusting circuit using feed back.
Figure 2:
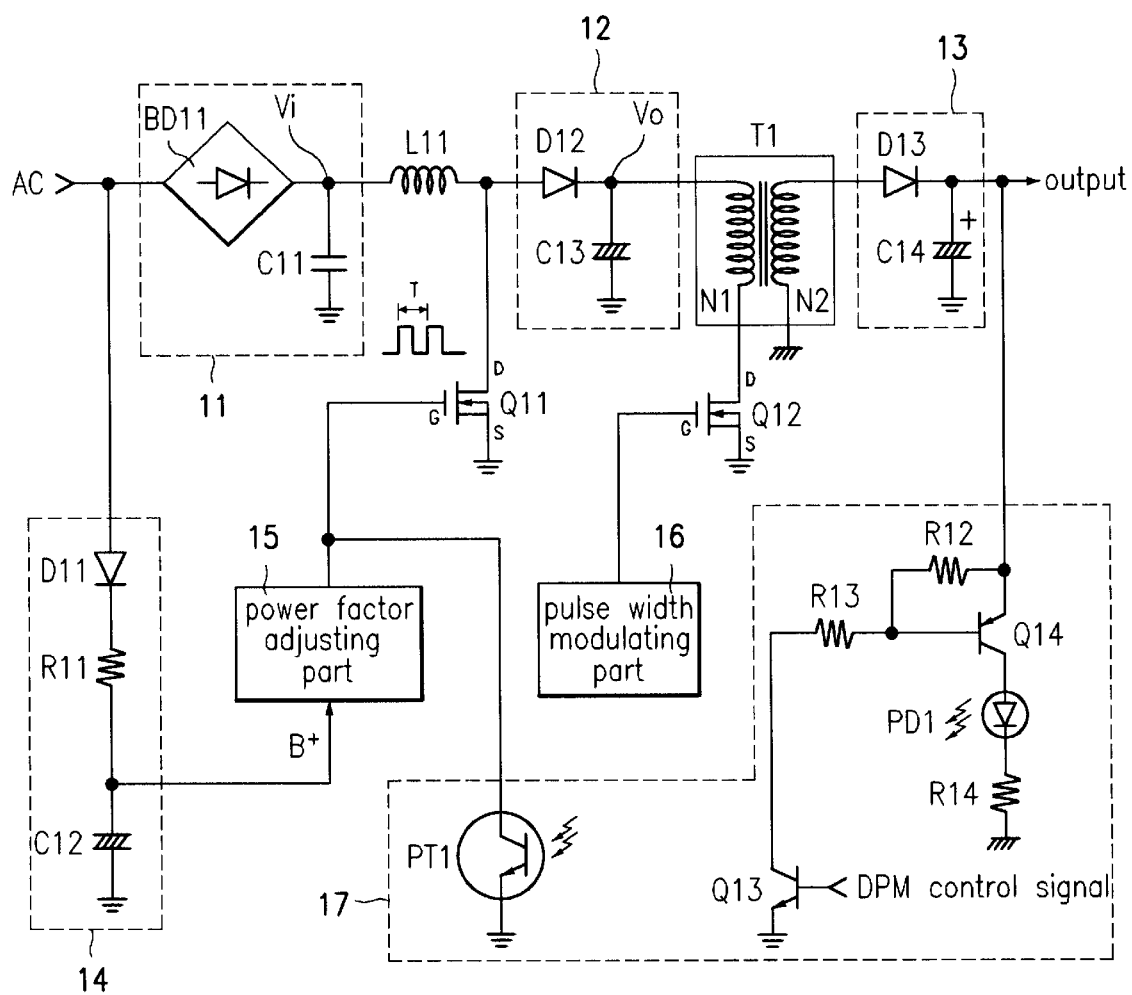
FIG. 2 illustrates a power saving circuit of a power factor adjusting type in accordance with a first embodiment of the present invention; and, FIG. 3 illustrates a power saving circuit of a power factor adjusting type in accordance with a second embodiment of the present invention.

Reference will now be made in detail to the preferred embodiments of the present invention, examples of which are illustrated in the accompanying drawings. FIG. 2 illustrates a power saving circuit of a power factor adjusting type in accordance with a first embodiment of the present invention.

Referring to FIG. 2, the power saving circuit of a power factor adjusting type in accordance with a first embodiment of the present invention includes a first power supply unit 11 for rectifying and smoothing an AC power to provide a DC voltage Vi, a first field effect transistor Q11 for switching the DC current Vi in the first power supply part 11 in a step-up fashion according to cycles of a gate voltage G, a first rectifying part 12 for applying the rectified and smoothened DC voltage $V_0$ to a transformer T1 according to the switching of the first field effect transistor Q11, a second field effect transistor Q12 for switching a DC voltage V0 from the first rectifying part 12 according to cycles of the gate voltage G, the transformer T1 for boosting the DC voltage V0 proportional to a winding ratio thereof according to switching of the second field effect transistor Q12, a second rectifying part 13 for rectifying the voltage boosted by the transformer T1 and applying to a peripheral circuit, a second power supplying part 14 for branching, and rectifying the AC power and applying a voltage B$^+$ to a power factor adjusting part 15, the power factor adjusting part 15 for applying a gate control signal to the first field effect transistor Q11 for controlling a power factor of the DC current Vi, a pulse width modulating part 16 for controlling a switching cycle of the second field effect transistor Q12, and a voltage cutting off part 17 adapted to cut off a gate control signal applied from the power factor controlling part 15 to the first field effect transistor Q11 for reducing a primary side power consumption of the transformer T1 according to the DPM control signal. The power factor adjusting part 15 is an integration of circuits. The voltage cutting off part 17 includes a transistor Q14 connected to an output terminal on the second rectifying part 13, a photodiode PD1 connected to a collector of the transistor Q14, a switching transistor Q13 connected to a base of the transistor Q14, and a phototransistor PT1 connected to an output terminal on the power factor adjusting part 15 and a gate terminal on the first field effect transistor Q11. The unexplained symbol BD11 denotes a bridge diode, C11~C14 denote condensers, D11~D13 denote diodes, L11 denotes a coil, and R11~R14 denote resistors.

The operation and advantage of the power saving circuit of a power factor adjusting type in accordance with a first preferred embodiment of the present invention will be explained.

First, the AC power is rectified and smoothened through the bridge diode BD11 and the condenser C11 in the first power supply part 11, to be provided as a DC voltage Vi. Then, when the DC voltage Vi flows to the drain terminal D on the first field effect transistor Q11, the transistor Q1 provides a DC voltage higher than the DC voltage V0 in a step-up fashion according to cycles T of a gate voltage.

$$V_0 = \frac{T_{off} + T_{on}}{T_{off}} \times Vi.$$

Where Ton denotes an 'on' time interval of the gate voltage cycle T of the first field effect transistor and 'off' denotes an 'off' time interval in the gate voltage cycle T of the first field effect transistor. The gate G voltage cycle T of the first field effect transistor Q11 is a gate current for adjusting a power factor of the DC voltage Vi by the power factor adjusting part 15. And, the voltage B$^+$ provided to the power factor adjusting part 15 is a DC voltage which is the AC voltage divided and rectified through the diode D11, the resistor R11, and the condenser C12 in the second power supplying part 14. The DC voltage V0 switched through the first field effect transistor Q11 is rectified and smoothened through the diode D12 and the condenser C13 in the first rectifying part 12 and flows to the drain D of the second field effect transistor Q12 through a primary winding N1 of the transformer T1. The second field effect transistor Q12 switches the DC voltage V0 supplied to the drain D in response to a control signal from the pulse width modulating part 16, and, when a pulse voltage is occurred in the primary winding N1 of the transformer T1 by the switching of the second field effect transistor Q12, a boosted voltage is induced in a secondary winding N2 proportional to a winding ratio. The voltage induced in the secondary winding N2 of the transformer T1 is rectified and smoothened through the diode D13 and the condenser C14 in the second rectifying part 13 and presented as a DC voltage. In the meantime if an 'on' time interval of the gate terminal of the first field effect transistor Q12 is made shorter by the pulse width modulating part 16 in a DPM on mode, a power consumption can he reduced because the pulse voltage occurred in the primary winding of the transformer T1 is lowered. And, the voltage cutting off part 17, put into operation in response to a DPM control signal (high), cuts off a gate control signal from the power factor adjusting part 15, to turn off the switching operation of the first field effect transistor Q11, thereby reducing a power consumption in the primary winding of the transformer T1. That is, in the DPM on mode, the voltage cutting off part 17 turns on the switching transistor Q13 according to a DPM control signal(high), and turns on the transistor Q14 having a base connected to a collector of the switching transistor Q12 and an emitter connected to an output terminal of the second rectifying part 13. In this instance, as the transistors Q13 and Q14 are turned on, a voltage from the second rectifying part 13 supplies to the emitter of the transistor Q14. Besides, the voltage is supplied to the photodiode PD1 connected to the collector of the transister Q14. When the photodiode PD1 emits a light, the light is incident to a base of the phototransistor PT1, to turn on the phototransistor PT1. As the phototransistor PT1 is turned on, the first field effect transistor Q11 is turned off, because the current from the power factor adjusting part 15 flows to the ground through the collector of the phototransistor PT1, instead of flowing to the gate G. Accordingly, by cutting off the current applied to the gate of the first field effect transistor Q11 in response to the DPM control signal, a power consumption in the primary side of the transformer T1 is prevented, thereby satisfying a power consumption below 5W in a product of 100W class pursuant to the EPA or NUTEK standard. In the meantime, in the DPM off mode, the voltage cutting off part 17 is not operative in response to the DPM control signal(low), providing a gate current from the power factor adjusting part 15 to the base of the first field effect transistor Q11. That is, since the switching transistor Q13 in the voltage cutting off part 17 is turned off in response to the DPM control signal(low), which causes the transistor Q14 having a base connected to the collector of the transistor Q13 to turn off, the photodiode PD1 is turned off. And, as the photodiode PD1 is inoperative, the phototransistor PT1 coupled thereto is not operative, too. Accordingly, as the power factor adjusting part 15 applies a gate G control signal to a base of the first field effect transistor Q11, the first rectifying part 12 can supply a stable DC voltage V0 to the primary winding of the transformer T1.

Figure 3:
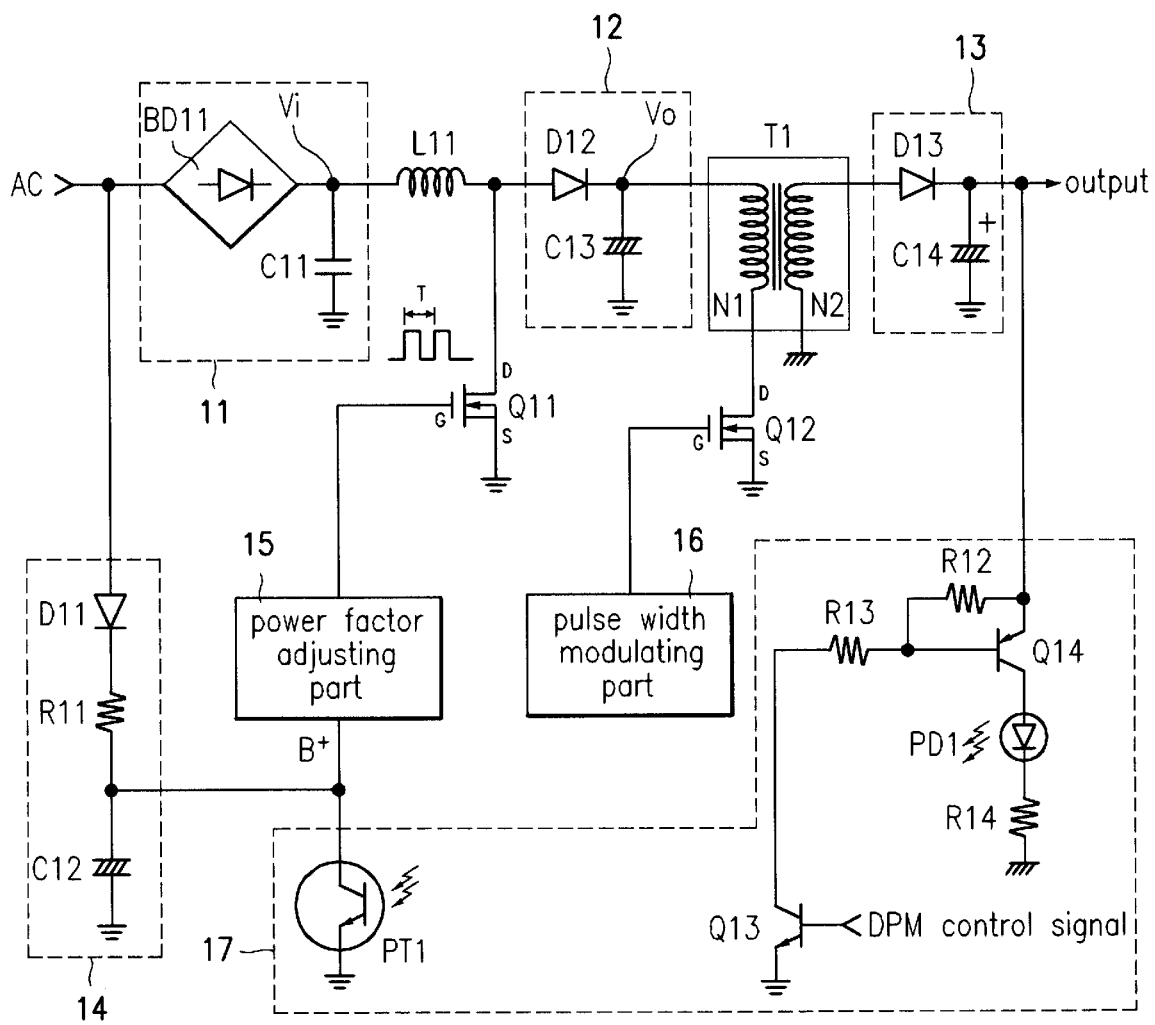

FIG. 3 illustrates a power saving circuit of a power factor adjusting type in accordance with a second embodiment of the present invention.

Referring to FIG. 3, the power saving circuit of a power factor adjusting type in accordance with a second embodiment of the present invention includes a first, and a second power supply parts 11 and 14 each for rectifying and smoothing an AC power to provide a DC voltage, a field effect transistor Q11 for switching the DC voltage Vi from the first power supply part 11 in a step up fashion according to cycles of a gate voltage, a power factor adjusting part 15 connected to a gate terminal of the first field effect transistor Q11 and an output terminal on the second power supply part 14 for adjusting a power factor of the DC voltage Vi from the first power supply part 11, a second power supply part 14 for rectifying the AC power to provide, and apply a voltage $B^+$ to the power factor adjusting part 15, a first rectifying part 12 for rectifying and smoothing a voltage provided by a switching of the first rectifying part 12, a second field effect transistor Q12 for switching a voltage from the first rectifying part 12 in response to the pulse width modulating signal, a transformer T1 for boosting the voltage in proportion to a winding ratio as the second field effect transistor Q12 is switched, a second rectifying part 13 for rectifying the voltage boosted by the transformer T1 and providing to a peripheral circuit, a voltage cut off part 17 connected between an output terminal on the second power supply part 14 and the second rectifying part 13 floor cutting off voltage generations in the primary and secondary windings of the transformer by means of photocoupler in reception of a DPM control signal.

The operation and advantage of the power saving circuit of a power factor adjusting type in accordance with a second preferred embodiment of the present invention will be explained.

First, the AC power is rectified and divided through the diode D11, the resistor R11, and the condenser C12 in the second power supply part 14, and provided as a desired voltage $B^+$. In this instance, a microcomputer(not shown) controls the voltage $B^+$ through the power cutting off part 17 when a DPM on mode is detected. The voltage cutting off part 17 turns on the transistors Q13 and Q14 in response to the DPM control signal(high), the turn on of the transistors Q13 and Q14 cause the photodiode PD1 to emit a light. The light from the photodiode PD1 turns on the phototransistor PT1. When the phototransistor PT1 is turned on, the input voltage $B^+$ supplied from the second supply part 14 is supplied to the ground through the collector of the phototransistor PT1. According to this the power supply is cut off to the power factor adjusting part 15. The power factor adjusting part 15 stops providing the gate control signal, to turn off the first field effect transistor Q11, thereby reducing a power consumption in the primary winding of the transformer T1.

The power saving circuit of a power factor adjusting type of the present invention as explained can comply with the standards both of the U.S.A and the Europe for a DPM mode by reducing a power consumption in the primary wilding of a transformer in a DPM mode of a monitor and allows a construction of the circuit to be produced at a low cost because no additional serve power is required for the DPM mode.

It will be apparent to those skilled in the art that various modifications and variations can be made in the power saving circuit of a power factor adjusting type of the present invention without departing from the spirit or scope of the invention. Thus it is intended that the present invention cover the modifications and variations of this invention provided they come within the scope of the appended claims and their equivalents.

What is claimed is:

1. A power saving circuit of a power factor adjusting type comprising:
   a rectifying and smoothing part for rectifying, and smoothing an AC power into a DC voltage;
   a transformer connected to an output terminal on the rectifying and smoothing part for boosting the DC voltage to a level in proportion to a winding ratio thereof;
   a plurality of field effect transistors each connected to the rectifying and smoothing part and a ground terminal of the transformer for switching the DC voltage; and,
   a voltage cutting off part connected to a gate terminal of the field effect transistor and a rectified voltage output terminal on the transformer for cutting off voltage generations in a primary winding and a secondary winding by means of photocoupler on reception of a control signal in a DPM mode.

2. A power saving circuit as claimed in claim 1, wherein the DPM mode is any one of a regular mode, a standby mode, and off mode.

3. A power saving circuit as claimed in claim 1, wherein the voltage cutting off part includes:
   a plurality of transistors for being supplied of a voltage from a second rectifying part and turned on in response to a DPM control signal, and
   a photocoupler for cutting off switching of the field effect transistor connected between the rectifying and smoothing parts by turning on of the transistors.

4. A power saving circuit as claimed in claim 3, wherein a phototransistor in the photocoupler is grounded connected to a base terminal on the field effect transistor.

5. A power saving circuit as claimed in claim 3, wherein the DPM signal is a high level signal.

6. A power saving circuit of a power factor adjusting type comprising:
   a first, and a second power supply parts each for rectifying and smoothing an AC power to provide a DC voltage;
   a field effect transistor for switching the DC voltage from the first power supply part in a step up fashion according to cycles of a gate voltage;
   a power factor adjusting part connected to a gate terminal of the first field effect transistor and an output terminal on the second power supply part for adjusting a power factor of the DC voltage front the first power supply part;
   a second power supply part for rectifying the AC power to provide, and apply a voltage $B^+$ to the power factor adjusting part;

a first rectifying part for rectifying and smoothing a voltage provided by a switching of the first rectifying part;

a second field effect transistor for switching a voltage from the first rectifying part in response to a pulse width modulating signal;

a transformer for boosting the voltage in proportion to a winding ratio as the second field effect transistor is switched;

a second rectifying part for rectifying the voltage boosted by the transformer and providing to a peripheral circuit;

a voltage cut off part connected between a gate terminal of the first field effect transistor and the second rectifying part for cutting off voltage generations in the primary and secondary windindgs of the transformer by means of photocoupler in reception of a DPM control signal.

7. A power saving circuit as claimed in claim 6, wherein the second field effect transistor has a gate terminal connected to a pulse width modulating part which fixes a switching period of a transistor.

8. A power saving circuit as claimed in claim 6, wherein the voltage cut off part includes;

a transistor connected to a voltage output terminal on the second rectifying part, a photodiode connected to a collector of the transistor, a switching transistor connected to a base of the transistor.

a phototransistor connected to an output terminal on the power factor controlling part and a base terminal of the first effect transistor.

9. A power saving circuit as claimed in claim 8, wherein the switching transistor is switched in response to the DPM control signal.

10. A power saving circuit as claimed in claim 9, wherein the DPM control signal is a low signal in a regular DPM mode, and a high signal both in a DPM standby mode and a DPM off mode.

11. A power saving circuit of a power factor adjusting type comprising:

a first, and a second power supply parts each for rectifying and smoothing an AC power to provide a DC voltage;

a field effect transistor for switching the DC voltage from the first power supply part in a step up fashion according to cycles of a gate voltage;

a power factor adjusting part connected to a gate terminal of the first field effect transistor and an output terminal on the second power supply part for adjusting a power factor of the DC voltage from the first power supply part;

a second power supply part for rectifying the AC power to provide, and apply a voltage $B^-$ to the power factor adjusting part, a first rectifying part for rectifying and smoothing a voltage provided by a switching of the first rectifying part;

a second field effect transistor for switching a voltage from the first rectifying part in response to a pulse width modulating signal;

a transformer for boosting the voltage in proportion to a winding ratio as the second field effect transistor is switched;

a second rectifying part for rectifying the voltage boosted by the transformer and providing to a peripheral circuit;

a voltage cut off part connected between an output terminal on the second power supply part and the second rectifying part for cutting off voltage generations in the primary and secondary windings of the transformer by means of photocoupler in reception of a DPM control signal.

12. A power saving circuit as claimed in claim 11, wherein the voltage cut off part includes;

a self bias type transistor operative on a voltage from the second rectifying part, a photodiode connected to an emitter of the transistor, a switching transistor connected to a base of the transistor, and a phototransistor having a collector connected both to an output terminal on the second power supply part and an input terminal on the power factor adjusting part.

13. A power saving circuit as claimed in claim 12, wherein the switching transistor is switched in response to the DPM control signal.

14. A power saving circuit as claimed in claim 13, wherein the DPM control signal is a low signal in a regular DPM mode, and a high signal both in a DPM standby mode and a DPM off mode.

* * * * *